(12) United States Patent
Mabuchi

(10) Patent No.: US 9,179,073 B2
(45) Date of Patent: Nov. 3, 2015

(54) SOLID-STATE IMAGE SENSOR AND DRIVING METHOD USING GAIN TO SET ADC AND GRAYSCALE OUTPUTS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 13/426,719

(22) Filed: Mar. 22, 2012

(65) Prior Publication Data

US 2012/0256078 A1 Oct. 11, 2012

(30) Foreign Application Priority Data

Apr. 6, 2011 (JP) ................................. 2011-084904

(51) Int. Cl.
*H04N 5/235* (2006.01)
*H04N 5/355* (2011.01)
*H04N 5/378* (2011.01)

(52) U.S. Cl.
CPC ......... *H04N 5/2351* (2013.01); *H04N 5/35545* (2013.01); *H04N 5/378* (2013.01)

(58) Field of Classification Search
CPC ............. G01J 1/42; G01J 1/4228; G01J 1/44; H01L 31/08; H01L 31/09; H01L 31/101; H03M 1/00; H03M 1/007; H03M 1/1057; H04N 5/2351; H04N 5/378; H04N 5/35545; H04N 5/35554
USPC ................................. 250/208.1, 214 R, 214.1
See application file for complete search history.

(56) References Cited

U.S. PATENT DOCUMENTS

| | | | | |
|---|---|---|---|---|
| 6,219,097 | B1* | 4/2001 | Kamishima et al. | 348/297 |
| 7,190,398 | B1* | 3/2007 | Yadid-Pecht et al. | 348/308 |
| 8,089,530 | B2* | 1/2012 | Mabuchi | 348/229.1 |
| 2009/0273695 | A1* | 11/2009 | Mabuchi | 348/300 |

FOREIGN PATENT DOCUMENTS

| | | |
|---|---|---|
| JP | 3680366 | 5/2005 |
| JP | 2008-167004 | 7/2008 |
| JP | 2010-074331 | 4/2010 |

OTHER PUBLICATIONS

Orly Yadid-Pecht; Wide Intrascene Dynamic Range CMOS APS Using Dual Sampling; IEEE Transactions on Electron Devices; vol. 44, No. 10; Oct. 1997.

Official Action (no English translation available) for Japanese Patent Application No. 2011-084904 mailed Nov. 20, 2014, 3 pages.

* cited by examiner

*Primary Examiner* — Georgia Y Epps
*Assistant Examiner* — Carolynn A Moore
(74) *Attorney, Agent, or Firm* — Sony Corporation

(57) ABSTRACT

A solid-state imaging device is provided that includes a pixel array section having pixels which detect a physical quantities that are arranged in two dimensions of a matrix; an Analog-Digital (AD) converting section that performs AD conversion for a plurality of channels of analog pixel signals which are read-out from the pixel array section; and a control section that sets quantized units AD-converted by the AD conversion section according to a gain setting of the unit pixel signal, where the control section determines a grayscale number of digital outputs AD-converted for at least one channel of the unit pixel signals according to the gain setting of the pixel signal.

9 Claims, 14 Drawing Sheets

FIG. 9

| GAIN | NUMBER OF GRAYSCALES(bit) | | INPUT RANGE OF AD CONVERSION CIRCUIT | | UNIT OF QUANTIZATION(1LSB) | | RATIO OF AMOUNT OF LIGHT FOR 1LSB WHEN SENSITIVITY RATIO IS MULTIPLIED BY 16 |
|---|---|---|---|---|---|---|---|
| | LOW ILLUMINANCE SIGNAL | HIGH ILLUMINANCE SIGNAL | LOW ILLUMINANCE SIGNAL | HIGH ILLUMINANCE SIGNAL | LOW ILLUMINANCE SIGNAL | HIGH ILLUMINANCE SIGNAL | |
| MULTIPLIED BY 1 | 10 | 12 | 500mV | 500mV | 0.5mV | 0.13mV | 4 |
| MULTIPLIED BY 2 | 11 | 12 | 500mV | 250mV | 0.25mV | 0.063mV | 4 |
| MULTIPLIED BY 4 | 12 | 12 | 500mV | 125mV | 0.13mV | 0.031mV | 4 |
| MULTIPLIED BY 8 | 12 | 12 | 250mV | 63mV | 0.063mV | 0.016mV | 4 |
| MULTIPLIED BY 16 | 12 | 12 | 125mV | 31mV | 0.031mV | 0.008mV | 4 |

FIG. 10

| GAIN | NUMBER OF GRAYSCALES(bit) | | INPUT RANGE OF AD CONVERSION CIRCUIT | | UNIT OF QUANTIZATION(1LSB) | | RATIO OF AMOUNT OF LIGHT FOR 1 LSB WHEN SENSITIVITY RATIO IS MULTIPLIED BY 16 |
|---|---|---|---|---|---|---|---|
| | LOW ILLUMINANCE SIGNAL | HIGH ILLUMINANCE SIGNAL | LOW ILLUMINANCE SIGNAL | HIGH ILLUMINANCE SIGNAL | LOW ILLUMINANCE SIGNAL | HIGH ILLUMINANCE SIGNAL | |
| MULTIPLIED BY 1 | 10 | 12 | 500mV | 500mV | 0.5mV | 0.13mV | 4 |
| MULTIPLIED BY 2 | 11 | 12 | 500mV | 250mV | 0.25mV | 0.063mV | 4 |
| MULTIPLIED BY 4 | 12 | 12 | 500mV | 125mV | 0.13mV | 0.031mV | 4 |
| MULTIPLIED BY 8 | 13 | 12 | 500mV | 63mV | 0.063mV | 0.016mV | 4 |
| MULTIPLIED BY 16 | 14 | 12 | 500mV | 31mV | 0.031mV | 0.008mV | 4 |

FIG. 11

| GAIN | NUMBER OF GRAYSCALES(bit) | | INPUT RANGE OF AD CONVERSION CIRCUIT | | UNIT OF QUANTIZATION(1LSB) | | RATIO OF AMOUNT OF LIGHT FOR 1 LSB WHEN SENSITIVITY RATIO IS MULTIPLIED BY 16 |
|---|---|---|---|---|---|---|---|
| | LOW ILLUMINANCE SIGNAL | HIGH ILLUMINANCE SIGNAL | LOW ILLUMINANCE SIGNAL | HIGH ILLUMINANCE SIGNAL | LOW ILLUMINANCE SIGNAL | HIGH ILLUMINANCE SIGNAL | |
| MULTIPLIED BY 1 | 10 | 12 | 500mV | 500mV | 0.5mV | 0.13mV | 4 |
| MULTIPLIED BY 2 | 11 | 12 | 500mV | 250mV | 0.25mV | 0.063mV | 4 |
| MULTIPLIED BY 4 | 12 | 12 | 500mV | 125mV | 0.13mV | 0.031mV | 4 |
| MULTIPLIED BY 8 | 13 | 12 | 500mV | 63mV | 0.063mV | 0.016mV | 4 |
| MULTIPLIED BY 16 | 14 | NOT USED | 500mV | NOT USED | 0.031mV | NOT USED | 4 |

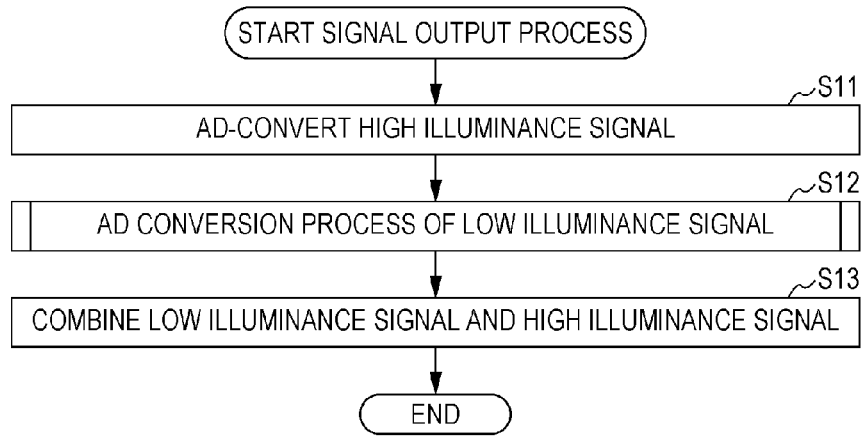
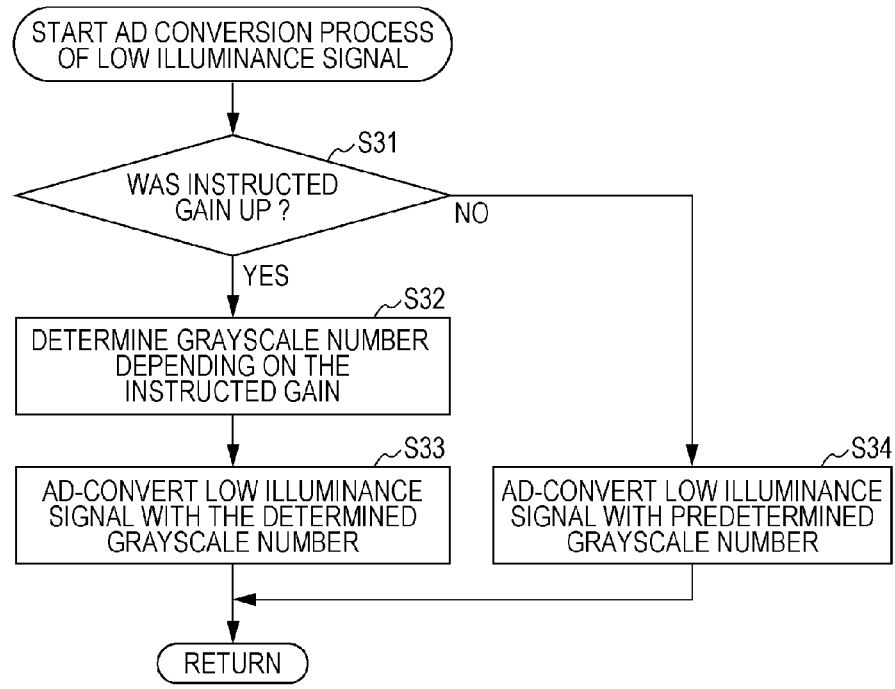

SOLID-STATE IMAGE SENSOR AND DRIVING METHOD USING GAIN TO SET ADC AND GRAYSCALE OUTPUTS

CROSS REFERENCE TO RELATED APPLICATIONS

This application claims the benefit of Japanese Priority Patent Application JP 2011-084904 filed Apr. 6, 2011, the entire contents of which are incorporated herein by reference.

BACKGROUND

The present technology relates to a solid-state image sensor and a driving method thereof, and an electronic apparatus, and particularly to a solid-state image sensor and a driving method thereof and an electronic apparatus which enable a plurality of signals having different sensitivities to be obtained and a dynamic range to be thereby expanded.

In the related art, as a technique for expanding a dynamic range of an amount of signal output according to an amount of incident light in a solid-state image sensor, techniques for reading out the same pixels plural times by differentiating an exposure time and combining the read-out signals having different sensitivities in a later stage are known (for example, JP 3680366B and "Wide Intrascene Dynamic Range CMOS APS Using Dual Sampling" written by Orly Yadid-Pecht and Eric R. Fossum for IEEE TRANSACTIONS ON ELECTRON DEVICES, VOL. 44, NO. 10, pp. 1721-1723, OCTOBER 1997).

SUMMARY

With the techniques described above, information of a low illuminance portion of a screen is obtained from a signal of a long exposure time and information of a high illuminance portion is obtained from a signal of a short exposure time. When, however, a subject has low illuminance, it is necessary to at least extend the long exposure time, but there is a limitation on lengthening the long exposure time. For example, in a dynamic image, a maximum exposure time of $\frac{1}{30}$ seconds can be obtained in general. In addition, even in the case of a still image, it is advised to avoid lengthening an exposure time a certain period of time or longer in order to suppress camera shake or subject shake.

In such a case, since even an amount of the signal of the long exposure time is small, it is necessary to raise settings of a gain of a solid-state image sensor. To raise settings of a gain, there are two techniques which include a technique for raising an analog gain before analog-to-digital (AD) conversion and a technique for raising a digital gain after AD conversion.

In the technique for raising a digital gain, grayscales of an image become coarse due to the raised digital gain. In addition, with the technique for raising an analog gain, when a portion of a screen is bright, a signal of the bright portion exceeds an input range of an AD conversion circuit that performs AD conversion, and even when there is a signal, the signal is discarded. Of course, the signal of the bright portion can be obtained from a signal of a short exposure time; however, the signal has a low signal-to-noise ratio (S/N) in comparison to a signal of a long exposure time, and thus there is a concern of the S/N of an obtained image becoming low.

The present technology takes the above circumstances into account, and aims to prevent loss of information of a portion in which a signal having a high sensitivity and a signal having a low sensitivity are combined when an analog gain is raised and thereby to be able to obtain an image with a high S/N when a dynamic range is to be extended by obtaining a plurality of signals having different sensitivities.

A solid-state image sensor according to an embodiment of the present technology includes a pixel array unit in which pixels that sense a physical amount are two-dimensionally arranged in a matrix shape, an analog-to-digital (AD) conversion unit configured to perform AD conversion on analog pixel signals of a plurality of channels read out from the pixel array unit, and a control unit configured to set a unit of quantization of AD conversion performed by the AD conversion unit according to a setting of a gain of the pixel signals. The control unit decides the number of grayscales of a digital output of AD conversion for the pixel signals of at least one channel according to the setting of the gain of the pixel signals.

When the gain of the pixel signals is raised, the control unit may decrease the unit of quantization of AD conversion performed by the AD conversion unit and increases the number of grayscales of the digital output of AD conversion for the pixel signals of at least one channel.

The AD conversion unit may perform AD conversion on the pixel signals of the plurality of channels having different sensitivities, and, when the gain of the pixel signals is raised, the control unit may decrease the unit of quantization of AD conversion performed by the AD conversion unit and increases the number of grayscales of the digital output of AD conversion for the pixel signals of at least one channel having a high sensitivity.

When the gain of the pixel signals is raised, the control unit may not change the number of grayscales of the digital output of AD conversion for the pixel signals of at least one channel having a low sensitivity.

The control unit may set the number of grayscales of the digital output of AD conversion for the pixel signals of at least one channel having the high sensitivity before the gain of the pixel signals is raised to be smaller than the number of grayscales of the digital output of AD conversion for the pixel signals of at least one channel having the low sensitivity.

The AD conversion unit may perform AD conversion for the pixel signals of the plurality of channels having the different sensitivities by differentiating a sensing time for which the pixels sense the physical amount.

A driving method of a solid-state image sensor according to an embodiment of the present technology is a driving method of a solid-state image sensor including a pixel array unit in which pixels that sense a physical amount are two-dimensionally arranged in a matrix shape, an analog-to-digital (AD) conversion unit configured to perform AD conversion on analog pixel signals of a plurality of channels read out from the pixel array unit, and a control unit configured to set a unit of quantization of AD conversion performed by the AD conversion unit according to a setting of a gain of the pixel signals, the method including controlling decision of the number of grayscales of a digital output of AD conversion for the pixel signals of at least one channel according to the setting of the gain of the pixel signals.

An electronic apparatus according to an embodiment of the present technology includes a solid-state image sensor that includes a pixel array unit in which pixels that sense a physical amount are two-dimensionally arranged in a matrix shape, an analog-to-digital (AD) conversion unit configured to perform AD conversion on analog pixel signals of a plurality of channels read out from the pixel array unit, and a control unit configured to set a unit of quantization of AD conversion performed by the AD conversion unit according to a setting of a gain of the pixel signals. The control unit decides the number of grayscales of a digital output of AD conversion for the pixel signals of at least one channel according to the setting of the gain of the pixel signals.

According to an embodiment of the present technology, AD conversion is performed on analog pixel signals of a plurality of channels read out from a pixel array unit, a unit of quantization of AD conversion performed by an AD conversion unit is set according to a setting of a gain of the pixel signals, and the number of grayscales of a digital output of the AD conversion for the pixel signals of at least one channel is decided according to the setting of the gain of the pixel signals.

According to an embodiment of the present technology, it becomes possible to prevent loss of information when an analog gain is raised and thereby to obtain an image with a high S/N when a dynamic range is to be extended by obtaining a plurality of signals having different sensitivities.

BRIEF DESCRIPTION OF THE DRAWINGS

FIG. 9 is a diagram showing relations between analog gains and the number of grayscales of the AD conversion circuits;
FIG. 10 is a diagram showing relations between the analog gains and the number of grayscales of the AD conversion circuits;
FIG. 11 is a diagram showing relations between the analog gains and the number of grayscales of the AD conversion circuits;
FIG. 12 is a flowchart for describing a signal output process;
FIG. 13 is a flowchart for describing an AD conversion process of a low illuminance signal.

DETAILED DESCRIPTION OF THE EMBODIMENT(S)

Figure 1:
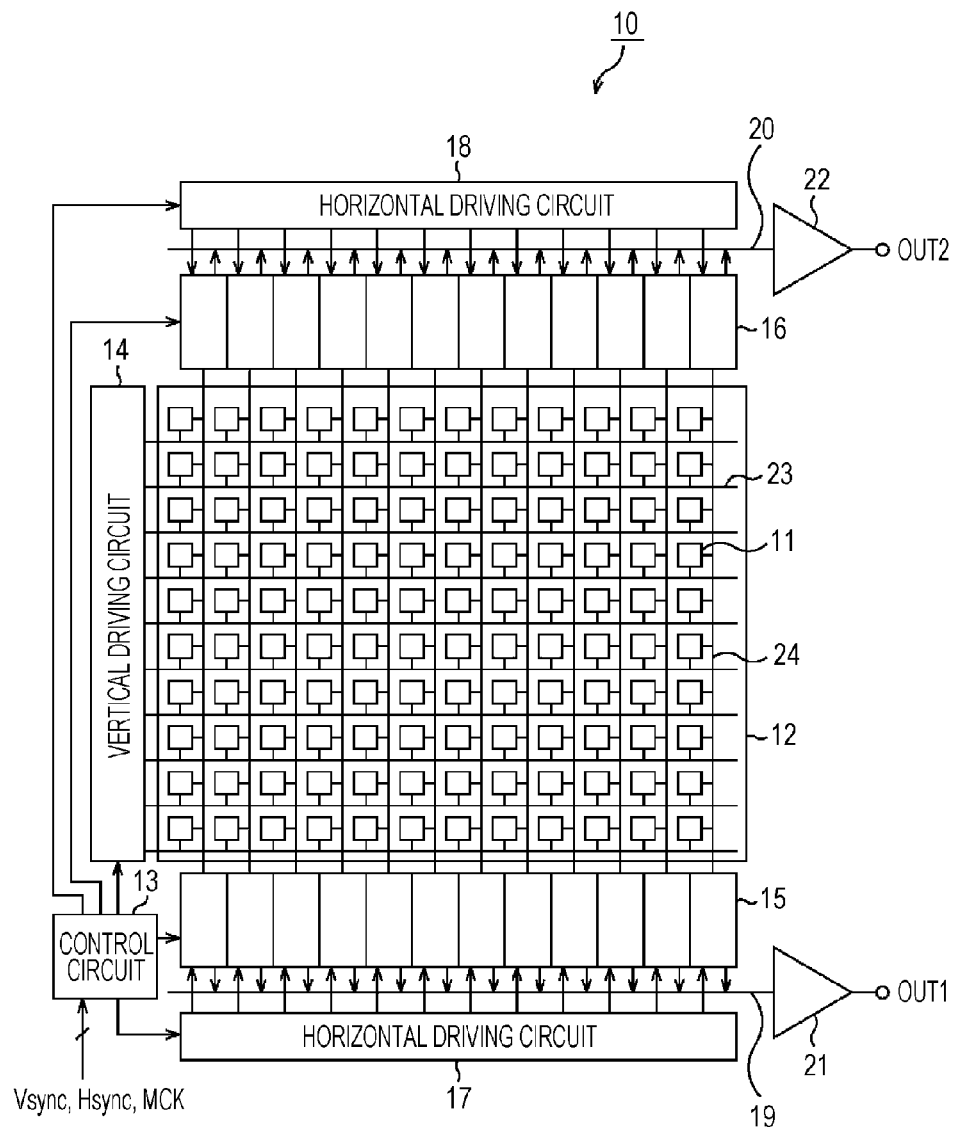
FIG. 1 is a diagram showing a configuration example of an embodiment of a solid-state image sensor to which the present technology is applied.

Hereinafter, embodiments of the present technology will be described with reference to the appended drawings.
[Configuration of a Solid-State Image Sensor]
FIG. 1 is a diagram showing a configuration of a solid-state image sensor according to an embodiment of the present technology. The present embodiment will be described exemplifying, as a solid-state image sensor, a complementary metal oxide semiconductor (CMOS) image sensor that senses an amount of electric charge according to an amount of visible light as a physical amount in units of pixels, for example.

As shown in FIG. 1, a CMOS image sensor 10 according to the present embodiment has a pixel array unit 12 in which unit pixels 11 (which will also be referred to hereinafter simply as pixels 11), each of which includes a photoelectric conversion element that performs photoelectric conversion on incident visible light into electric charge in an amount according to an amount of the light, are two-dimensionally arranged in a row-column shape (a matrix shape).

The CMOS image sensor 10 is also provided, in addition to the pixel array unit 12, a control circuit 13 that controls the entire CMOS image sensor 10, a vertical drive circuit 14 that drives each pixel 11 of the pixel array unit 12, column signal processing circuits 15 and 16 of n channels (n is an integer equal to or greater than 2; in the present example, n=2) that process signals output from each pixel 11, horizontal drive circuits 17 and 18, horizontal signal lines 19 and 20, and output circuits 21 and 22.

To be specific, the CMOS image sensor 10 has signal processing sections of two channels, in other words, has a system configuration in which the column signal processing circuits 15, the horizontal drive circuit 17, the horizontal signal line 19, and the output circuit 21 are disposed on the upper side of the pixel array unit 12, and the column signal processing circuits 16, the horizontal drive circuit 18, the horizontal signal line 20, and the output circuit 22 are disposed on the lower side of the pixel array unit 12.

In the system configuration, the control circuit 13 receives data for commanding an operation mode of the CMOS image sensor 10 and the like from outside, and outputs data including information of the CMOS image sensor 10 to outside.

Further, the control circuit 13 generates clock signals, control signals, and the like which serve as references for operations of the circuits such as the vertical drive circuit 14, the column signal processing circuits 15 and 16, the horizontal drive circuits 17 and 18, and the like based on a vertical synchronization signal Vsync, a horizontal synchronization signal Hsync, and a master clock MCK. The clock signals, control signals, and the like generated by the control circuit 13 are given to the vertical drive circuit 14, the column signal processing circuits 15 and 16, the horizontal drive circuits 17 and 18, and the like.

In the pixel array unit 12, the unit pixels 11 are two-dimensionally arranged in a matrix shape. As shown in FIG. 1, the unit pixels 11 are arranged side by side substantially in a square grid shape. This means that optical apertures defined by photoelectric conversion elements, metal wires, and the like are arranged side by side substantially in a square grid shape, but a circuit portion of the unit pixels 11 is not limited thereto. In other words, it is not necessary to arrange the circuit portion of the unit pixels 11 to be described later side by side substantially in a square gird shape.

Further, in the pixel array unit 12, pixel driving wires 23 are formed for each pixel row in the array of the matrix shape of the pixel units 11 in the lateral direction (the pixel array direction of pixel rows) of the diagram, and vertical signal lines 24 are formed for each pixel column in the longitudinal direction (the pixel array direction of pixel columns) of the diagram. One ends of the pixel driving wires 23 are connected to output terminals of the vertical drive circuit 14 corresponding to each pixel row.

The vertical drive circuit 14 is constituted by a shift register, an address decoder, and the like, selects and scans each pixel 11 of the pixel array unit 12 in units of rows in a sequential manner, and supplies necessary driving pulses (control pulses) to each pixel in a selected row through the pixel driving wires 23.

Although a detailed configuration of the vertical drive circuit 14 is not illustrated, the vertical drive circuit is configured to have a read-out scanning system for sequentially selecting and scanning pixels 11 which read out signals in units of rows, and a sweep-out scanning system for performing sweep-out scanning on a read-out row that will undergo read-out scanning by the read-out scanning system, in which unnecessary electric charge is swept (reset) from photoelectric conversion elements of the pixels 11 in the read-out row a shutter speed time period earlier than the read-out scanning.

Through sweeping-out (resetting) of unnecessary electric charge by the sweep-out scanning system, a so-called electronic shutter operation is performed. Hereinafter, the sweep-out scanning system will be referred to as an electronic shutter scanning system. Herein, the electronic shutter operation refers to an operation of discarding optical electric charge of a photoelectric conversion element and then starting new exposure (starting accumulation of optical electric charge).

A signal read out in a read-out operation by the read-out scanning system corresponds to an amount of light incident after the previous read-out operation or electronic shutter operation. In addition, the period from a read-out timing of the previous read-out operation or a sweep-out timing of the electronic shutter operation to a read-out timing of the current read-out operation is an accumulation time of optical electric charge (exposure time) in each unit pixel 11.

Signals output from each pixel 11 in a selected row are supplied to the column signal processing circuits 15 or the column signal processing circuits 16 through each of the vertical signal lines 24. The column signal processing circuits 15 and 16 are arranged, for example, for each of the pixel columns of the pixel array unit 12, in other words, on upper and lower sides of the pixel array unit 12 in one-to-one correspondence with the pixel columns.

The column signal processing circuits 15 and 16 receive the signals output from each of the pixels 11 in the selected row of each pixel row of the pixel array unit 12 for each pixel column, and then performs signal processes such as a correlated double sampling (CDS) process for removing noise of a fixed pattern that is unique for pixels, a signal amplifying process, or an AD conversion process on the signals.

Note that, herein, although the case in which the column signal processing circuits 15 and 16 employ the configuration in which the circuits are in one-to-one correspondence with the pixel columns is exemplified, the present technology is not limited to this configuration, and a configuration in which, for example, each one of the column signal processing circuits 15 and 16 are arranged for each group of the plurality of pixel columns (or for the vertical signal lines 24) and the column signal processing circuits 15 and 16 are shared by the plurality of pixel columns in a time division manner or the like can also be employed.

The horizontal drive circuit 17 is constituted by a shift register, an address decoder, and the like, and selects the column signal processing circuit 15 in order by sequentially outputting horizontal scanning pulses. The horizontal drive circuit 18 is also constituted by a shift register, an address decoder, and the like, and selects the column signal processing circuit 16 in order by sequentially outputting horizontal scanning pulses like the horizontal drive circuit 17.

Note that, although not illustrated, horizontal selection switches are provided in each output stage of the column signal processing circuits 15 and 16 to be connected to the horizontal signal lines 19 and 20. Horizontal scanning pulses φH1 to φHx sequentially output from the horizontal drive circuits 17 and 18 turn the horizontal selection switches provided in each output stage of the column signal processing circuits 15 and 16 on in order. As the horizontal selection switches are turned on in order in response to the horizontal scanning pulses, pixel signals that have been processed by the column signal processing circuits 15 and 16 for each pixel column are output to the horizontal signal lines 19 and 20 in order.

The output circuits 21 and 22 perform various signal processes on the pixel signals supplied from each of the column signal processing circuits 15 and 16 through the horizontal signal lines 19 and 20 in order and then output the signals. As specific signal processes performed by the output circuits 21 and 22, for example, there may only be buffering, or black level adjustment before buffering, correction of unevenness of each column, signal amplification, a color-related process, and the like can be performed.

[Circuit Configuration of a Unit Pixel]

Figure 2:
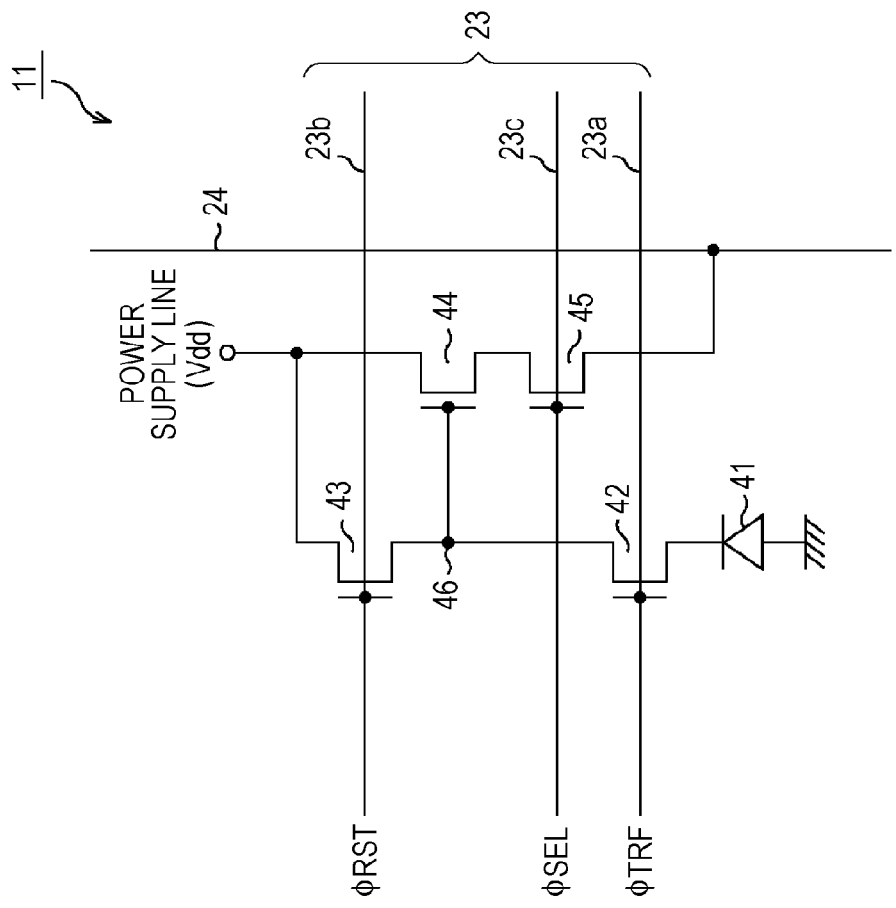
FIG. 2 is a diagram showing a circuit configuration example of a unit pixel.

FIG. 2 is a diagram showing an example of a circuit configuration of the unit pixel 11. The unit pixel 11 shown in FIG. 2 has a photodiode 41 that is a photoelectric conversion element, a transfer transistor 42, a reset transistor 43, an amplifying transistor 44, and a selection transistor 45.

Here, as the four transistors from the transfer transistor 42 to the selection transistor 45, for example, an N-channel MOS transistor is used. The combination of the conductivity types of the transfer transistor 42, the reset transistor 43, the amplifying transistor 44, and the selection transistor 45 is merely an example, and the present technology is not limited to this combination.

In addition, as shown in FIG. 2, for the unit pixel 11, three driving wires including, for example, a transfer wire 23a, a reset wire 23b, and a selection wire 23c are commonly provided as pixel driving wires 23 for each pixel of the same pixel row. One end of each of the transfer wire 23a, the reset wire 23b, and the selection wire 23c is connected to an output terminal of the vertical drive circuit 14 corresponding to a pixel row, in units of pixel rows The anode of the photodiode 41 is connected to a negative-side power supply, for example, is grounded, and performs photoelectric conversion on received light into optical electric charge (herein, photoelectrons) in an amount according to an amount (a physical amount) of the light. The cathode of the photodiode 41 is electrically connected to the gate of the amplifying transistor 44 via the transfer transistor 42. A node 46 that is electrically connected to the gate of the amplifying transistor 44 is called a floating diffusion (FD) unit.

The transfer transistor 42 is connected between the cathode of the photodiode 41 and the FD unit 46, and is turned on when a transfer pulse φTRF of a high level (for example, a Vdd level) that is active (hereinafter referred to as "high and active") is given to the gate via the transfer wire 23a, and then transfers the optical electric charge that has undergone photoelectric conversion by the photodiode 41 to the FD unit 46.

The drain of the reset transistor 43 is connected to a pixel power supply Vdd and the source thereof is connected to the FD unit 46, and is turned on when a high and active reset pulse φRST is given to the gate thereof via the reset wire 23b, and then resets the FD unit 46 by discarding electric charge of the FD unit 46 to the pixel power supply Vdd prior to transfer of signal electric charge from the photodiode 41 to the FD unit 46.

The gate of the amplifying transistor 44 is connected to the FD unit 46 and the drain thereof is connected to the pixel power supply Vdd, outputs the electric potential of the FD unit 46 after a reset by the reset transistor 43 as a reset level, and outputs the electric potential of the FD unit 46 after the transfer transistor 42 transfers signal electric charge as a signal level.

The drain of the selection transistor 45 is connected to, for example, the source of the amplifying transistor 44 and the source thereof is connected to the vertical signal line 24, is turned on when a high and active selection pulse φSEL is given to the gate thereof via the selection wire 23c, and relays a signal output from the amplifying transistor 44 to the vertical signal line 24 in a selection state of the unit pixel 11.

Note that the selection transistor 45 can also employ a circuit configuration in which the selection transistor 45 is connected between the pixel power supply Vdd and the drain of the amplifying transistor 44.

In addition, the unit pixel 11 is not limited to having the above configuration with the four transistors which are configured as described above, and may have a configuration with three transistors, one of which serves as the amplifying transistor 44 and the selection transistor 45 or the like, and the circuit configuration is arbitrary.

[Example in which Signals Having Different Sensitivities of a Plurality of Channels are Obtained]

In the CMOS image sensor 10 according to the present embodiment configured as described above, signals having different sensitivities of a plurality of channels, two channels in this example, are set to be obtained from each pixel 11 of the pixel array unit 12 in order to achieve a wide dynamic range.

The vertical drive circuit 14 is set to execute shutter scanning using the electronic shutter scanning system and read-out scanning of two channels by the read-out scanning system, and to obtain signals having different sensitivities of two channels (to vary sensitivities of the signals of the two channels) by differentiating a sensing time in which the pixels 11 of the pixel array unit 12 sense an amount of light as a physical amount, i.e., an exposure time. The length of the exposure time (sensing time) is adjusted to be an interval of the read-out scanning of the two channels. This will be described in detail below.

Figure 3:
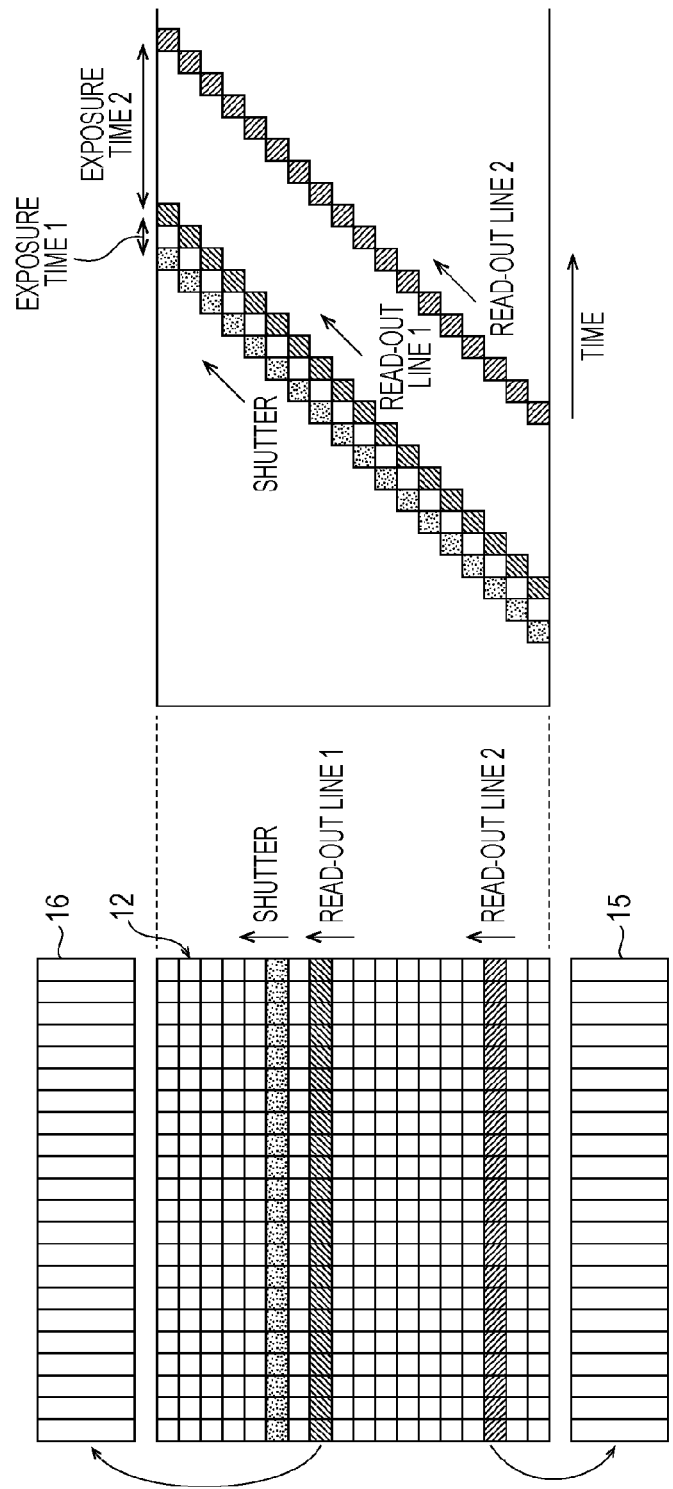
FIG. 3 is a diagram for describing shutter scanning and read-out scanning of two channels for obtaining signals having different sensitivities of two channels.

In read-out scanning, scanning is performed in each of two pixel rows which are set as read-out rows 1 and 2 of two channels as shown on the left side of FIG. 3, and each of the vertical signal lines 24 reads out signals of each of the pixels from the two read-out rows 1 and 2. Note that the column signal processing circuits 15 and 16 of the two channels are provided to correspond to the read-out scanning of the two channels.

In this vertical scanning, the time in which scanning is performed from the shutter row to the read-out row 1 for which first read-out scanning is performed is an exposure time 1 and the time in which scanning is performed from the read-out row 1 to the read-out row 2 in which second read-out scanning is performed is an exposure time 2 as shown on the right side of FIG. 3, and thus, by differentiating the two consecutive exposure times (accumulation times) 1 and 2 from each other, two signals having different sensitivities, i.e., a signal with a low sensitivity based on the short exposure time 1 and a signal with a high sensitivity based on the long exposure time 2 can be consecutively obtained from the same pixels. Setting of the exposure times 1 and 2 is performed by the control circuit 13.

By combining the two signals having different sensitivities, i.e., the signal with a low sensitivity and the signal with a high sensitivity, using a combining circuit (not illustrated) provided in the later stage, an image signal with a wide dynamic range can be obtained. Information of a high illuminance portion of the signal of the image obtained as above is obtained from the signal with a low sensitivity based on the short exposure time 1, and information of a low illuminance portion of the obtained image signal is obtained from the signal with a high sensitivity based on the long exposure time 2. Hereinbelow, the signal with a low sensitivity will be referred to as a high illuminance signal and the signal with a high sensitivity will be referred to as a low illuminance signal.

Also, the shutter scanning and the read-out scanning described above can be realized by the following configuration.

That is to say, in the vertical drive circuit 14 that has the read-out scanning system and the electronic shutter scanning system (sweep-out scanning system) as described above, the electronic shutter scanning system includes, for example, the shift register, and by outputting electronic shutter pulses from the shift register from a first row in units of pixel rows in order, an operation of shutter scanning, which is a so-called rolling shutter operation (or a focal-plane shutter operation), can be performed from the first row in order.

On the other hand, the read-out scanning system includes two shift registers, and by outputting scanning pulses 1 and 2 for selecting the read-out rows 1 and 2 from the two shift registers in order, read-out scanning of two channels can be performed. In addition, read-out scanning of two channels can also be performed by causing the read-out scanning system to have an address decoder and the address decoder to designate the row addresses of the read-out rows 1 and 2.

By performing the shutter scanning by the electronic shutter scanning system and the read-out scanning of two channels by the read-out scanning system as described above, signals having different sensitivities of the two channels can be obtained.

Specifically, the shutter row is scanned first and then the two read-out rows 1 and 2 are scanned as shown on the left side of FIG. 3. For example, signals output from each pixel of the read-out row 1 can be read out by the column signal processing circuits 15, and signals output from each pixel of the read-out row 2 can be read out by the column signal processing circuits 16. The combination of the read-out rows 1 and 2 and the column signal processing circuits 15 and 16 can be set to vary.

Which of the column signal processing circuits 15 and 16 will read out signals of which of the read-out rows 1 and 2 is decided based on an operation timing of each of the column signal processing circuits 15 and 16. In other words, when the column signal processing circuits 15 (or 16) operate at a scanning timing of the read-out row 1, signals of each of the pixels in the read-out row 1 are read by the column signal processing circuits 15 (or 16), and when the column signal processing circuits 16 (or 15) operate at a scanning timing of the read-out row 2, signals of each of the pixels in the read-out row 2 are read by the column signal processing circuits 16 (or 15).

The right side of FIG. 3 shows a state of scanning by setting the horizontal axis as time. Herein, the read-out row 1 is set to have a short exposure time 1, the read-out row 2 to have a long exposure time 2, and as an example, the exposure time 1 is set to be a time 2H (H is a horizontal period) for two rows and the exposure time 2 to be a time 8H for 8 rows for the sake of easy understanding. Accordingly, each pixel in the read-out row 1 has a low sensitivity, and each pixel in the read-out row 2 has a sensitivity four times that of a corresponding pixel in the read-out row 1.

[Configuration of a Column Signal Processing Circuit]

Figure 4:
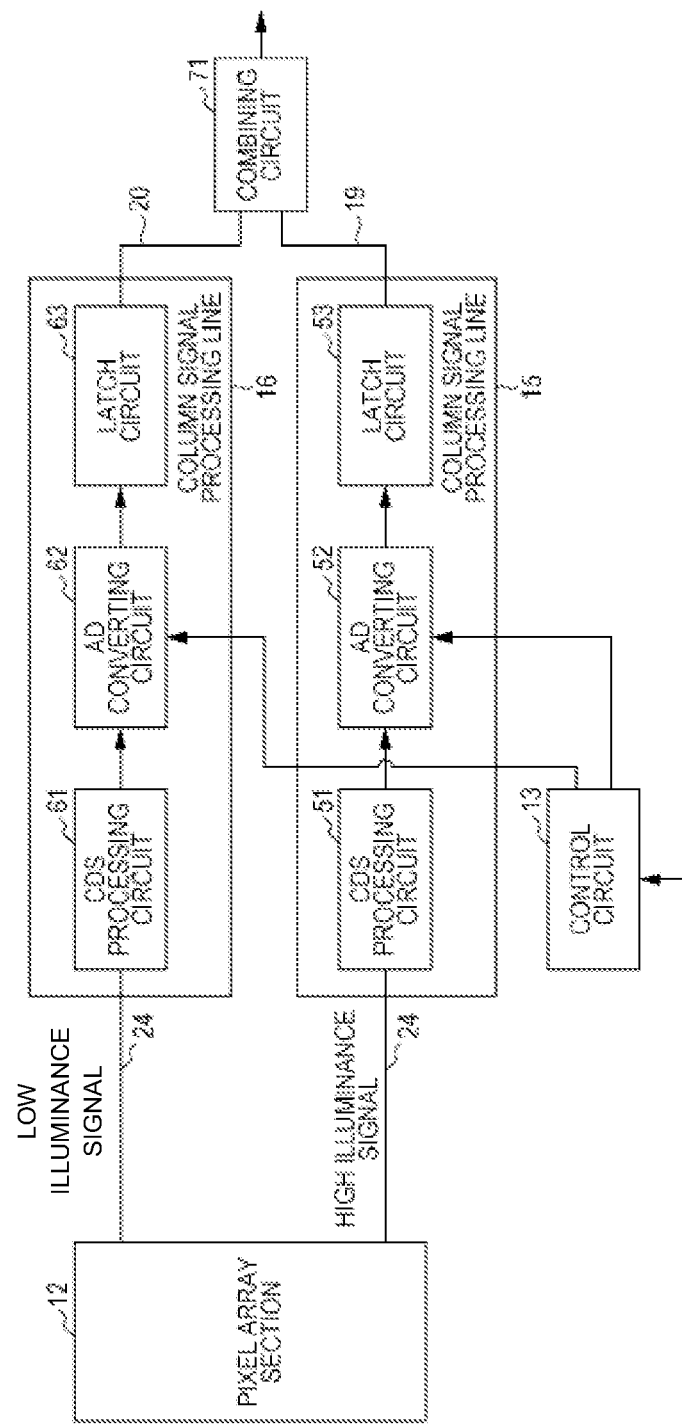
FIG. 4 is a block diagram showing a configuration example of column signal processing circuits.

FIG. 4 is a block diagram showing a configuration example of the column signal processing circuits 15 and 16. Herein, for the convenience of description, both of the column signal processing circuits 15 and 16 are illustrated as allowing a signal to flow from left to right.

The column signal processing circuit 15 is constituted by a CDS processing circuit 51, an AD conversion circuit 52, and a latch circuit 53.

The CDS processing circuit 51 performs a CDS process for obtaining the difference between a reset level and a signal level described above supplied from the pixels 11 constituting the pixel array unit 12 through the vertical signal line 24, thereby removing noise of a fixed pattern that is unique for the pixels from (a high illuminance signal of) the signal level according to an amount of incident light. The AD conversion circuit 52 converts an analog signal (the high illuminance signal) of which noise has been removed by the CDS processing circuit 51 into a digital signal under control of the control circuit 13. The latch circuit 53 stores the digital signal that is AD-converted and then output from the AD conversion circuit 52.

The column signal processing circuit 16 also has the same basic configuration as the column signal processing circuit 15. To be specific, the column signal processing circuit 16 is constituted by a CDS processing circuit 61, an AD conversion circuit 62, and a latch circuit 63.

That is to say, the CDS processing circuit 61 performs a CDS process for obtaining the difference between a reset level and a signal level described above supplied from the pixels 11 constituting the pixel array unit 12 through the vertical signal line 24, thereby removing noise of a fixed pattern that is unique for the pixels from (a low illuminance signal of) the signal level according to an amount of incident light. The AD conversion circuit 62 converts an analog signal (the low illuminance signal) of which noise has been removed by the CDS processing circuit 61 into a digital signal under control of the control circuit 13. The latch circuit 63 stores the digital signal AD-converted and then output from the AD conversion circuit 62.

Then, the digital signal DH corresponding to the high illuminance signal stored in the latch circuit 53 passes through the horizontal signal line 19 and then is read out through horizontal scanning performed by the horizontal drive circuit 17, and the digital signal DL corresponding to the low illuminance signal stored in the latch circuit 63 passes through the horizontal signal line 20 and then is read out through horizontal scanning performed by the horizontal drive circuit 18.

Further, a combining circuit 71 combines the digital signal DH corresponding to the high illuminance signal read out from the latch circuit 53 and the digital signal DL corresponding to the low illuminance signal read out from the latch circuit 63, and then outputs the signal as a combined signal D. Note that the combining circuit 71 is provided with a memory for retaining signals of a plurality of rows, and when a signal from the read-out row 1 is temporarily retained and a signal of the same pixel is read out from the read-out row 2, the signals are combined.

Note that the output circuits 21 and 22 are not illustrated in FIG. 4; however, in reality, pixel signals from the column signal processing circuits 15 are supplied to the output circuit 21 and pixel signals from the column signal processing circuits 16 are supplied to the output circuit 22 as described with reference to FIG. 1. In other words, the combining circuit 71 combines the digital signal DH output from the output circuit 21 and the digital signal DL output from the output circuit 22.

[Combining of a Low Illuminance Signal and a High Illuminance Signal]

Herein, a combining process of the digital signal DH corresponding to the high illuminance signal and the digital signal DL corresponding to the low illuminance signal by the combining circuit 71 will be described with reference to FIGS. 5 and 6.

Note that, hereinbelow, the digital signal DH corresponding to the high illuminance signal and the digital signal DL corresponding to the low illuminance signal will be referred to simply as a high illuminance signal DH and a low illuminance signal DL respectively.

Figure 5:
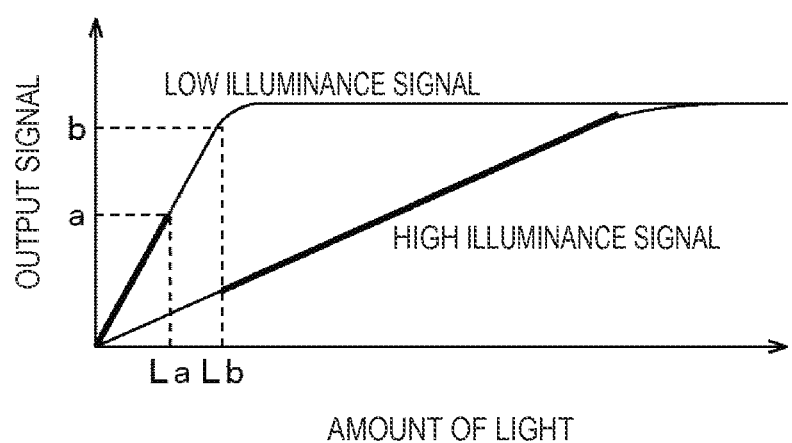
FIG. 5 is a diagram showing dynamic ranges of a low illuminance signal and a high illuminance signal with respect to an amount of incident light.

FIG. 5 shows dynamic ranges of the low illuminance signal DL and the high illuminance signal DH with respect to an amount of incident light of the CMOS image sensor 10.

Herein, when a ratio of a sensitivity of an analog low illuminance signal to that of an analog high illuminance signal (sensitivity ratio), in other words, a ratio between analog outputs of the pixel 11 per unit amount of light, is 4:1, the ratio of the amount of light of the low illuminance signal to that of the high illuminance signal per 1 mV (light amount ratio) is 1:4, and the following relation as shown in formula (1) below is satisfied between the low illuminance signal DL and the high illuminance signal DH per unit of quantization of AD conversion (1 LSB).

$$\text{Low illuminance signal } DL = \text{High illuminance signal } DH \times 4 \quad (1)$$

At that time, the combining circuit 71 outputs the low illuminance signal DL as a combined signal D with respect to a low illuminance portion of a screen without change, and outputs the quadrupled high illuminance signal DH as a combined signal D with respect to a high illuminance portion of the screen. In other words, the combining circuit 71 selectively outputs any of the low illuminance signal DL and the high illuminance signal DH as the combined signal D. Accordingly, the dynamic range can be expanded.

In reality, however, since there is an error in the relation shown in formula (1), it was not possible to output an accurate digital signal in the vicinity of an amount of light that is on the boundary on which any of the low illuminance signal DL or the high illuminance signal DH is to be selected.

Thus, the combining circuit 71 weights the low illuminance signal DL when an amount of light is positioned on the low illuminance side in the range from La to Lb shown in FIG. 5, and weights (applies a weighted average to) the high illuminance signal DH when the amount is positioned on the high illuminance side in the range from La to Lb, and then outputs the combined signal D shown in formula (2) below.

$$\text{Combined signal } D = \text{Low illuminance signal } DL \times \alpha + \text{High illuminance signal } DH \times 4 \times (1-\alpha) \quad (2)$$

Figure 6:
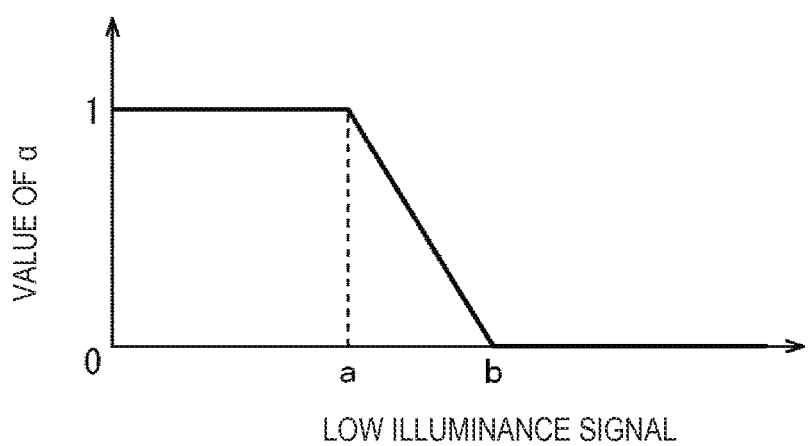
FIG. 6 is a diagram for describing a coefficient to be used when a low illuminance signal and a high illuminance signal are combined.

Note that, in formula (2), the coefficient $\alpha$ is set to be a value as shown in FIG. 6. In other words, the coefficient $\alpha$ is 1 when the low illuminance signal DL is smaller than the value a that corresponds to the amount of light La, and 0 when the low illuminance signal DL is greater than the value b that corresponds to the amount of light Lb. In addition, when the low illuminance signal DL is greater than the value a that corresponds to the amount of light La and smaller than the value b that corresponds to the amount of light Lb, the coefficient $\alpha$ changes from 1 to 0 according to the increase of the value of the low illuminance signal DL. Note that the value 4 in formula (2) is the value based on the ratio of the amount of light of the low illuminance signal to that of the high illuminance signal per unit of quantization.

Therefore, the combining circuit 71 outputs the low illuminance signal DL (the thick line portion of the low illuminance signal in FIG. 5) as the combined signal D when the amount of light is smaller than La, multiplies the high illuminance signal DH by 4 (the thick line portion of the high illuminance signal in FIG. 5) and then outputs the signal as the combined signal D when the amount of light is greater than Lb, and on top of that, outputs the combined signal D to which a weighted average is applied shown in formula (2) described above when the amount of light is greater than La and smaller than Lb.

Thus, the combining circuit 71 can expand the dynamic range and output an accurate digital signal.

When a gain of the CMOS image sensor 10 according to the present embodiment is set to be raised, a technique for raising an analog gain is adopted. To be specific, the control circuit 13 sets a unit of quantization (1 LSB) of AD conversion performed by the AD conversion circuits 52 and 62 according to a setting of the analog gain to raise the analog gain. Specifically, for example, in order to double a digital signal output from the combining circuit 71, in other words, double a gain of the low illuminance signal DL and the high illuminance signal DH output from the column signal processing circuits 15 and 16, the unit of quantization of AD conversion performed by the AD conversion circuits 52 and 62 is multiplied by ½.

Figure 7:
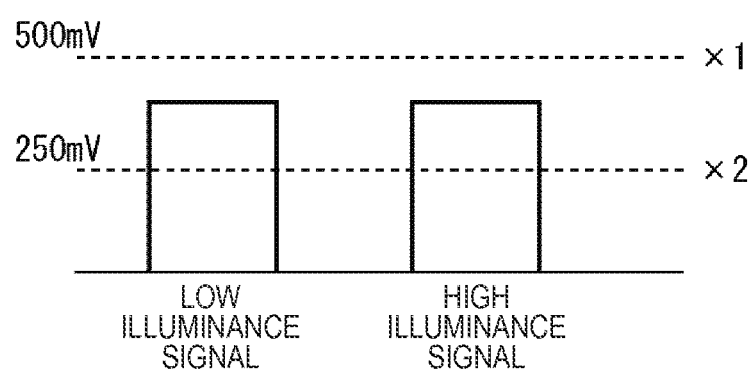
FIG. 7 is a diagram showing relations between analog gains and input ranges of AD conversion circuits.

Here, in FIG. 7, a maximum of 400 mV of a signal (analog signal) from the pixel 11 of the pixel array unit 12 is set to be output, and an input range of the respective AD conversion circuits 52 and 62 is set to be from 0 to 500 mV. When the analog gain is set to be multiplied by 1 (×1), both of the low illuminance signal and the high illuminance signal are AD-converted up to the maximum output value (400 mV) of the pixels 11 as shown in FIG. 7. When, however, the analog gain is set to be multiplied by 2 (×2), the unit of quantization of AD conversion is multiplied by ½, and thus the input range of the respective AD conversion circuits 52 and 62 is from 0 to 250 mV accordingly. Thus, only signals of up to 250 mV of both of the low illuminance signal and the high illuminance signal are subject to AD conversion as shown in FIG. 7, and thereby information corresponding to the signal from 250 to 400 mV is lost.

In this case, out of the low illuminance signal of FIG. 5 indicated by the thick line portion output as the combined signal D without change, information corresponding to the signal obtained near the amount of light La is lost. The lost information can also be set to be obtained from the high illuminance signal; however, the high illuminance signal has a lower S/N than the low illuminance signal, and thus there is concern of the S/N of an obtained image being low.

Thus, the control circuit 13 decides the number of grayscales of a digital output of the low illuminance signal AD-converted by the AD conversion circuit 62 according to the setting of the analog gain. To be specific, when the analog gain is raised, the control circuit 13 increases the number of grayscales of the digital output of the low illuminance signal AD-converted by the AD conversion circuit 62, i.e., the number of output bits. Here, the number of grayscales refers to the number of grayscales of AD conversion, which is a power of 2 such as 1024 for 10 bits, or 4096 for 12 bits. Note that AD conversion can also be performed with the number of grayscales, for example, 3000 or the like rather than a power of 2 depending on a type of the AD conversion circuit.

[Relation Between an Analog Gain and the Number of Grayscales of AD Conversion for a Low Illuminance Signal]

Figure 8:
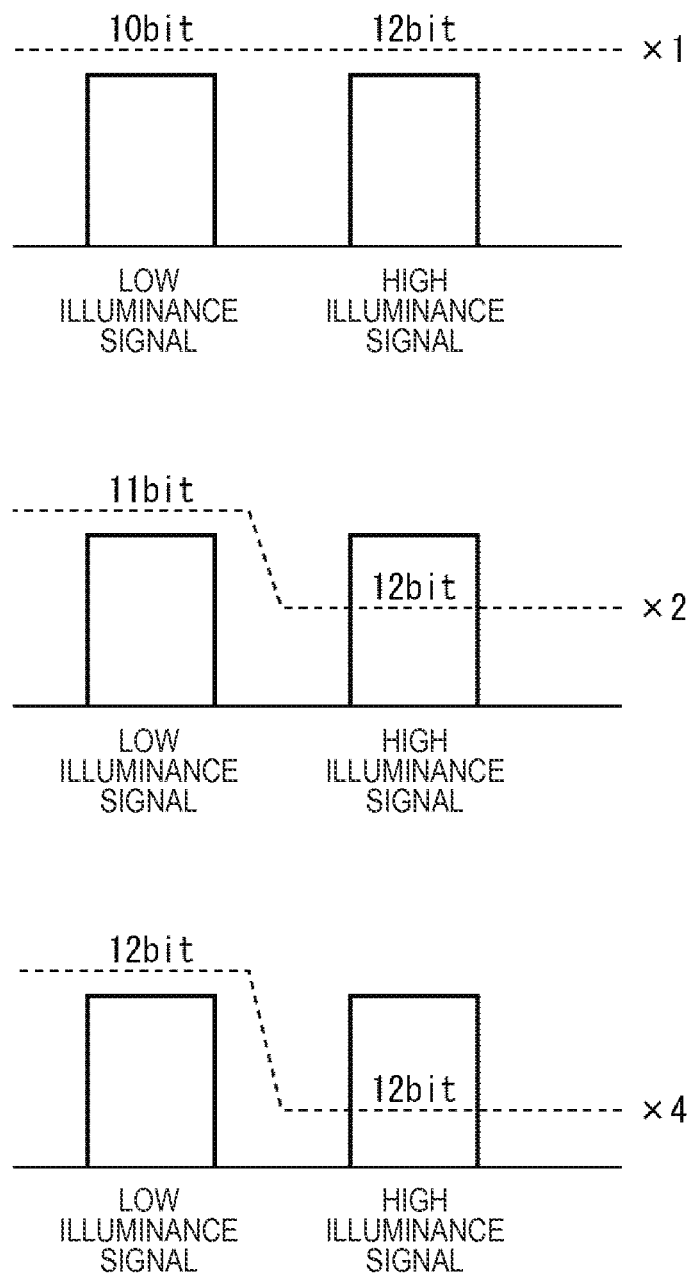
FIG. 8 is a diagram showing relations between analog gains and the number of grayscales of the AD conversion circuits.

Herein, a relation between a setting of a gain and the number of grayscales of AD conversion will be described with reference to FIGS. 8 and 9. FIG. 8 is a diagram showing the relation between an analog gain and the number of grayscales of AD conversion for the low illuminance signal and the high illuminance signal, and FIG. 9 shows a relation between the number of grayscales of AD conversion for the low illuminance signal and the high illuminance signal with respect to analog gains, input ranges, the units of quantization (1 LSB), and ratios of the amounts of light for 1 LSB.

Note that each of the AD conversion circuits 52 and 62 can perform AD conversion of a maximum of 12 bits of a digital output, and the number of output bits (the number of grayscales) is set to be variable.

To be specific, for example, when the AD conversion circuits 52 and 62 have a configuration in which a reference voltage is compared to an input voltage while the reference voltage is swept, or are delta-sigma-type AD conversion circuits, the number of grayscales can be variable by changing an operation frequency of a counter or changing a time taken for AD conversion. In addition, when the AD conversion circuits 52 and 62 are successive approximation-type AD conversion circuits, the number of grayscales can be variable according to the number of comparisons. Further, when the AD conversion circuits 52 and 62 are flash-type AD conversion circuits, the number of grayscales can be variable by setting an unnecessary comparator to be in a standby state, and when the AD conversion circuits 52 and 62 are pipeline-type AD conversion circuits, the number of grayscales can be variable according to the number of stages to be used.

Note that configurations of the AD conversion circuits 52 and 62 are not limited to the above, and any configuration in which the number of grayscales can be variable is possible.

(1) Case of a Normal Gain with No Gain Set (a Gain is Set to be Multiplied by 1)

First, both of the low illuminance signal and the high illuminance signal are AD-converted to the maximum output value (for example, 400 mV) of the pixels 11 of the pixel array unit 12 as shown in the upper part of FIG. 8. At this time, the digital output of AD conversion by the AD conversion circuit 62 for the low illuminance signal is set to be a maximum of 10 bits, and the digital output of AD conversion by the AD conversion circuit 52 for the high illuminance signal is set to be a maximum of 12 bits by the control circuit 13.

In this case, the input range of the respective AD conversion circuits 52 and 62 is from 0 to 500 mV, and the units of quantization of the AD conversion performed by the AD conversion circuits 52 and 62 are about 0.13 mV and 0.5 mV, respectively, as shown in FIG. 9. In addition, the sensitivity ratio between the low illuminance signal to the high illuminance signal, i.e., the ratio of analog outputs of the pixels 11 per unit amount of light, is set to be 16:1, the ratio of the amount of light of the low illuminance signal to that of the high illuminance signal for 1 mV is 1:16, and thus the ratio of the amount of light of the low illuminance signal to that of the high illuminance signal per unit of quantization (1 LSB) is 1:4 (in FIG. 9, when the amount of light of the low illuminance signal per unit of quantization is set to 1, the value 4 indicating the amount of light of the high illuminance signal is described). In addition, when the unit of quantization (1 LSB) of the low illuminance signal is used as a reference, the input range of the AD conversion circuit 52 with respect to the high illuminance signal is 14 bits. Thus, the combined signal D is 14 bits.

(2) Case in which a Gain is Set to be Multiplied by 2

In this case, the control circuit 13 sets the unit of quantization of AD conversion performed by the AD conversion circuits 52 and 62 to be multiplied by ½ the value in the case of the normal gain. In this case, a maximum of the digital output of AD conversion by the AD conversion circuit 62 for the low illuminance signal is set to be 11 bits and a maximum of the digital output of AD conversion by the AD conversion circuit 52 for the high illuminance signal is set to be 12 bits without change by the control circuit 13 as shown in the middle portion of FIG. 8. Accordingly, only the high illuminance signal of up to 250 mV is subject to AD conversion, and thereby information corresponding to the signal from 250 to 400 mV is lost; however, the low illuminance signal is AD-converted to its maximum output value of the pixels 11.

In other words, as shown in FIG. 9, the input ranges of the AD conversion circuits 52 and 62 are 250 mV and 500 mV, respectively, and the units of quantization of AD conversion performed by the AD conversion circuits 52 and 62 are about 0.063 mV and 0.25 mV, respectively. In addition, if the sensitivity ratio between the low illuminance signal and the high illuminance signal is set to be 16:1, the ratio of the amount of light of the low illuminance signal to that of the high illuminance signal for 1 mV is 1:16, and thus the ratio of the amount of light of the low illuminance signal to that of the high illuminance signal per unit of quantization (1 LSB) is 1:4 as in the case of the normal gain. In addition, when the unit of quantization (1 LSB) of the low illuminance signal is used as a reference, the input range of the AD conversion circuit 52 with respect to the high illuminance signal is 14 bits. Thus, the combined signal D is 14 bits.

(3) A Case in which a Gain is Set to be Multiplied by 4

In this case, the control circuit 13 sets the unit of quantization of AD conversion performed by the AD conversion circuits 52 and 62 to be multiplied by ½ the value when the gain is set to be multiplied by 2. In this case, the digital output of AD conversion by the AD conversion circuit 62 for the low illuminance signal is set to be a maximum of 12 bits and the digital output of AD conversion by the AD conversion circuit 52 for the high illuminance signal is set to be a maximum of 12 bits by the control circuit 13 as shown in the lower portion of FIG. 8. Accordingly, only the high illuminance signal of up to 125 mV is subject to AD conversion, and thereby information corresponding to the signal from 125 to 400 mV is lost; however, the low illuminance signal is AD-converted to its maximum output value of the pixels 11.

In other words, as shown in FIG. 9, the input ranges of the AD conversion circuits 52 and 62 are 125 mV and 500 mV, respectively, and the units of quantization of AD conversion performed by the AD conversion circuits 52 and 62 are about 0.031 mV and 0.13 mV, respectively. In addition, if the sensitivity ratio between the low illuminance signal and the high illuminance signal is set to be 16:1, the ratio of the amount of light of the low illuminance signal to that of the high illuminance signal for 1 mV is 1:16, and thus the ratio of the amount of light of the low illuminance signal to that of the high illuminance signal per unit of quantization (1 LSB) is 1:4 as in the case of the normal gain. In addition, when the unit of quantization (1 LSB) of the low illuminance signal is used as a reference, the input range of the AD conversion circuit 52 with respect to the high illuminance signal is 14 bits. Thus, the combined signal D is 14 bits.

(4) A Case in which a Gain is Set to be Multiplied by 8

In this case, the control circuit 13 sets the unit of quantization of AD conversion performed by the AD conversion circuits 52 and 62 to be multiplied by ½ the value when the gain is set to be multiplied by 4. In this case, the AD conversion circuits 52 and 62 each perform AD conversion of the digital output to a maximum of 12 bits, and thus the control circuit 13 sets both of the digital output of AD conversion by the AD conversion circuit 62 for the low illuminance signal and the digital output of AD conversion by the AD conversion circuit 52 for the high illuminance signal to be the maximum of 12 bits without change. Accordingly, only the high illuminance signal of up to 63 mV is subject to AD conversion, and thereby information corresponding to the signal from 63 to 400 mV is lost, and only the low illuminance signal of up to 250 mV is subject to AD conversion, and thereby information corresponding to the signal from 250 to 400 mV is lost.

In other words, as shown in FIG. 9, the input ranges of the AD conversion circuits 52 and 62 are 63 mV and 250 mV, respectively, and the units of quantization of AD conversion performed by the AD conversion circuits 52 and 62 are about 0.016 mV and 0.63 mV, respectively. In addition, if the sensitivity ratio between the low illuminance signal and the high illuminance signal is set to be 16:1, the ratio of the amount of light of the low illuminance signal to that of the high illuminance signal for 1 mV is 1:16, and thus the ratio of the amount of light of the low illuminance signal to that of the high illuminance signal per unit of quantization (1 LSB) is 1:4 as in the case of the normal gain. In addition, when the unit of quantization (1 LSB) of the low illuminance signal is used as a reference, the input range of the AD conversion circuit 52 with respect to the high illuminance signal is 14 bits. Thus, the combined signal D is 14 bits.

(5) A Case in which a Gain is Set to be Multiplied by 16

In this case, the control circuit 13 sets the unit of quantization of AD conversion performed by the AD conversion circuits 52 and 62 to be multiplied by ½ the value when the gain is set to be multiplied by 8. In this case, the AD conversion circuits 52 and 62 each perform AD conversion of the digital output to a maximum of 12 bits, and thus the control circuit 13 sets both of the digital output of AD conversion by the AD conversion circuit 62 for the low illuminance signal and the digital output of AD conversion by the AD conversion circuit 52 for the high illuminance signal to be the maximum of 12 bits without change as in the case in which the gain is set to be multiplied by 8. Accordingly, only the high illuminance signal of up to 31 mV is subject to AD conversion, and thereby information corresponding to the signal from 31 to 400 mV is lost, and further only the low illuminance signal of up to 125 mV is subjected to AD conversion, and thereby information corresponding to the signal from 125 to 400 mV is lost.

In other words, as shown in FIG. 9, the input ranges of the AD conversion circuits 52 and 62 are 31 mV and 125 mV, respectively, and the units of quantization of AD conversion performed by the AD conversion circuits 52 and 62 are about 0.008 mV and 0.031 mV, respectively. In addition, if the sensitivity ratio between the low illuminance signal and the high illuminance signal is set to be 16:1, the ratio of the amount of light of the low illuminance signal to that of the high illuminance signal for 1 mV is 1:16, and thus the ratio of the amount of light of the low illuminance signal to that of the high illuminance signal per unit of quantization (1 LSB) is 1:4 as in the case of the normal gain. In addition, when the unit of quantization (1 LSB) of the low illuminance signal is used as a reference, the input range of the AD conversion circuit 52 with respect to the high illuminance signal is 14 bits. Thus, the combined signal D is 14 bits.

As described above, in the case of the normal gain, the control circuit 13 decides the number of grayscales of AD conversion by the AD conversion circuit 62 on the low illuminance signal to be the number of bits smaller than the number of grayscales of AD conversion on the high illuminance signal by the AD conversion circuit 52, and by increasing the number of grayscales (increasing the number of bits) of AD conversion by the AD conversion circuit 62 for the low illuminance signal each time the gain is set to be raised, the input range of the AD conversion circuit 62 can be maintained in the same manner as the case of the normal gain even when the unit of quantization is small.

In addition, the AD conversion circuit 62 performs AD conversion to the maximum of 12 bits of the digital output, and thus, in the example described above, when the gain is set to be multiplied by 8 or greater, it is not possible to increase the number of grayscales (increase the number of bits) of AD conversion by the AD conversion circuit 62 for the low illuminance signal. In this case, information corresponding to the low illuminance signal that is not subjected to AD conversion is lost.

As described above, in the example of FIG. 9, the input range of the AD conversion circuit 62 can be maintained in the same manner as the case of the normal gain for up to the gain multiplied by 4.

Here, if the AD conversion circuit 62 is set to be capable of performing AD conversion up to the maximum of 14 bits of the digital output, the input range of the AD conversion circuit 62 can be maintained in the same manner as the case of the normal gain for a higher gain setting.

In other words, as shown in FIG. 10, when the gain is set to be multiplied by 8, the control circuit 13 sets the unit of quantization of AD conversion performed by the AD conversion circuits 52 and 62 to be multiplied by ½ the value of the case in which the gain is set to be multiplied by 4. At that time, the control circuit 13 sets the digital output of AD conversion by the AD conversion circuit 62 for the low illuminance signal to be a maximum of 13 bits, and the digital output of AD conversion by the AD conversion circuit 52 for the high illuminance signal to be a maximum of 12 bits without change. Accordingly, only the high illuminance signal of up to 63 mV is subjected to AD conversion, and information corresponding to the signal from 63 to 400 mV is lost; however, the low illuminance signal is AD-converted up to the maximum output value of the pixels 11.

In addition, when the gain is set to be multiplied by 16, the control circuit 13 sets the unit of quantization of AD conversion performed by the AD conversion circuits 52 and 62 to be multiplied by ½ the value of the case in which the gain is set to be multiplied by 8. At that time, the control circuit 13 sets the digital output of AD conversion performed by the AD conversion circuit 62 for the low illuminance signal to be a maximum of 14 bits, and the digital output of AD conversion by the AD conversion circuit 52 for the high illuminance signal to be the maximum of 12 bits without change. Accordingly, only the high illuminance signal of up to 31 mV is subjected to AD conversion, and information corresponding to the signal from 31 to 400 mV is lost; however, the low illuminance signal is AD-converted up to the maximum output value of the pixels 11.

As described above, in the example of FIG. 10, the input range of the AD conversion circuit 62 can be maintained in the same manner as the case of the normal gain for up to the gain multiplied by 16.

In addition, in the example of FIG. 10, when the sensitivity ratio is multiplied by 16 and the gain is multiplied by 16, 500 mV of the low illuminance signal and 31 mV of the high illuminance signal has substantially the same amount of light, and thus the high illuminance signal is not necessary. Under this condition, the high illuminance signal may be described as "not used" as shown in FIG. 11.

Note that, although the numbers of output bits (the number of grayscales) of AD conversion by the respective AD conversion circuits 52 and 62 are set to be variable in the above description, the number of output bits of the AD conversion circuit 52 may be fixed to 12 bits and only the number of output bits of the AD conversion circuit 62 may be set to be variable.

In addition, in the above description, the number of grayscales of the high illuminance signal is set to be uniform independently of the gain because the number of bits of the combined signal D is set to be a fixed value, for example, 14 or the like. Accordingly, in the system in the later stage, it is possible to perform general signal processing for 14 bits without being aware of the configuration in the earlier state to which the present technology is applied. In a system in which the number of bits of the combined signal D does not have to be uniform, the number of bits of the combined signal D is changed by raising the gain and increasing the number of grayscales of the high illuminance signal however, by performing signal processing while referring to the information using special means, maximum information can be obtained.

[Regarding a Signal Output Process]

Next, a signal output process performed by the CMOS image sensor 10 to combine the low illuminance signal and the high illuminance signal from the pixel array unit 12 and output the signals as a digital signal will be described with reference to FIG. 12.

In Step S11, the column signal processing circuit 15 performs AD-conversion on the high illuminance signal from the pixel array unit 12.

To be specific, in the column signal processing circuit 15, the CDS processing circuit 51 performs a CDS process on the signal (high illuminance signal) from the pixels 11 of the pixel array unit 12, and supplies the signal to the AD conversion circuit 52. The AD conversion circuit 52 AD-converts the analog high illuminance signal supplied from the CDS processing circuit 51 based on control of the control circuit 13. Here, when setting of an analog gain is instructed, the control circuit 13 sets a unit of quantization of AD conversion by the AD conversion circuit 52 according to the instructed setting of the analog gain. The digital high illuminance signal DH AD-converted by the AD conversion circuit 52 is stored in the latch circuit 53.

In Step S12, the column signal processing circuit 16 performs a low illuminance signal AD conversion process for AD-converting the low illuminance signal from the pixel array unit 12. As details of the low illuminance signal AD conversion process will be described later with reference to FIG. 13, the digital low illuminance signal DL obtained as a result of the low illuminance signal AD conversion process is stored in the latch circuit 63.

In Step S13, the combining circuit 71 combines the high illuminance signal DH stored in the latch circuit 53 and the low illuminance signal DL stored in the latch circuit 63 based on formula (2) described above, and then outputs the result as the combined signal D.

[Regarding the Low Illuminance Signal AD Conversion Process]

Next, details of the low illuminance signal AD conversion process executed in Step S12 of the flowchart of FIG. 12 will be described with reference to FIG. 13.

In Step S31, the control circuit 13 determines whether or not raising the gain has been instructed, in other words, whether or not there is an instruction to set the analog gain to be raised.

In Step S31, when raising the gain is determined to have been instructed, the process proceeds to Step S32, and then the control circuit 13 decides the number of grayscales of AD conversion by the AD conversion circuit 62 according to the instructed gain. For example, when there is an instruction that the gain is set to be multiplied by 2, the number of grayscales of AD conversion by the AD conversion circuit 62 is decided to be 11 bits as in the example of FIG. 9 described above.

In Step S33, the AD conversion circuit 62 AD-converts the low illuminance signal with the number of grayscales decided by the control circuit 13.

To be specific, the CDS processing circuit 61 performs a CDS process on the signal (low illuminance signal) from the pixels 11 of the pixel array unit 12, and then supplies the signal to the AD conversion circuit 62. The AD conversion circuit 62 AD-converts the analog low illuminance signal supplied from the CDS processing circuit 61 based on the unit of quantization of AD conversion set by the control circuit 13 according to the setting of the analog gain and the number of grayscales of AD conversion decided by the control circuit 13. The digital low illuminance signal DL AD-converted by the AD conversion circuit 62 is stored in the latch circuit 63.

On the other hand, when it is determined that there is no instruction of raising the gain in Step S31, the process proceeds to Step S34.

In Step S34, the AD conversion circuit 62 AD-converts the analog low illuminance signal from the CDS processing circuit 61 with the given number of grayscales decided already by the control circuit 13. The digital low illuminance signal DL AD-converted by the AD conversion circuit 62 is stored in the latch circuit 63.

According to the above process, by increasing the number of grayscales (increasing the number of bits) of AD conversion by the AD conversion circuit 62 for the low illuminance signal when the gain is set to be raised, it is possible to maintain the input range of the AD conversion circuit 62 in the same manner as before the gain is set to be raised even when the unit of quantization is small. Thus, when a plurality of signals having different sensitivities are obtained to expand the dynamic range, out of the signals indicated by the thick line portion that will be output as the combined signal D without change of the low illuminance signal of FIG. 5, for example, information corresponding to the signal obtained in the vicinity of the amount of light La can be prevented from being lost, and thereby an image with a high S/N can be obtained.

In addition, the AD conversion circuit 62 can perform AD conversion with a high number of output bits (number of gray scales), but is controlled (driven) so as to perform AD conversion by lowering the number of output bits when the gain is set to be low, and thus power consumption necessary for AD conversion by the AD conversion circuit 62 can be suppressed under a low gain setting.

Further, as described with reference to FIG. 9, even when the setting of the gain is changed, the ratio of the amount of light of the low illuminance signal to that of the high illuminance signal per unit of quantization will not change from 1:4. Thus, there is no need to change the calculation formula of the combined signal D expressed as formula (2), and thus it is possible to avoid an increase in a load of an arithmetic operation of the combining circuit 71.

Note that, although the example in which the present technology is applied to the configuration in which the dynamic range is expanded by differentiating an exposure time and thereby obtaining a plurality of signals having different sensitivities has been described above, the present technology can also be applied to another configuration in which a plurality of signals having different sensitivities are obtained. That is to say, the present technology may be applied to a configuration in which, for example, a plurality of signals having different sensitivities are obtained to expand the dynamic range using a difference between capacities of readout units inside a pixel.

In addition, although two column signal processing circuits are set to be provided for each column (two circuits on the upper and lower sides of the pixel array unit 12) above, one column signal processing circuit, for example, may be provided for each column, and accordingly signals of respective pixels in a plurality of rows may be provided in order by the one column signal processing circuit.

Further, the present technology is not limited to the application to the solid-state image sensor. In other words, the present technology can be applied to overall electronic apparatuses that use a solid-state image sensor in their image receiving units (photoelectric conversion units) including imaging apparatuses such as digital still cameras, and video cameras, mobile terminal devices having an imaging function, copying machines that use a solid-state image sensor in their image capturing units, and the like. The solid-state image sensor may be in the form of one chip, or may be in the form of a module having an imaging function in which an imaging unit and a signal processing unit or an optical unit are arranged and packaged.

[Configuration Example of an Electronic Apparatus to which the Present Technology is Applied]

Figure 14:
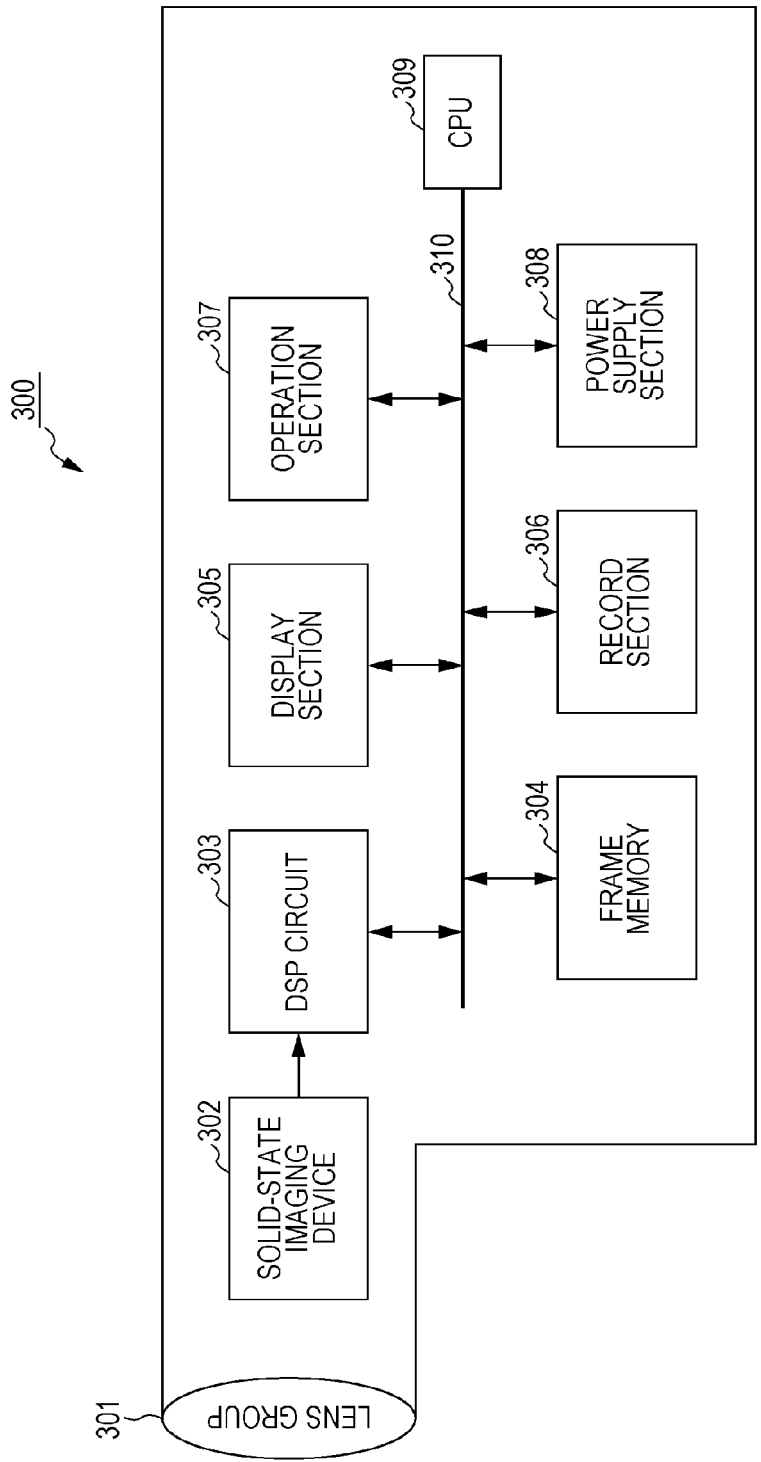
FIG. 14 is a diagram showing a configuration example of an embodiment of an electronic apparatus to which the present technology is applied.

FIG. 14 is a diagram showing a configuration example of an imaging apparatus as an electronic apparatus to which the present technology is applied.

An imaging apparatus 300 of FIG. 14 is provided with an optical unit 301 constituted by a lens group and the like, a solid-state image sensor (imaging device) 302 that employs each configuration of the unit pixel 11 described above, and a digital signal processor (DSP) circuit 303 that is a camera signal processing circuit. In addition, the imaging apparatus 300 is also provided with a frame memory 304, a display unit 305, a recording unit 306, a manipulation unit 307, a power supply unit 308, and a CPU 309. The DSP circuit 303, the frame memory 304, the display unit 305, the recording unit 306, the manipulation unit 307, the power supply unit 308, and the CPU 309 are connected to one another via a bus line 310.

The optical unit 301 forms an image on the image plane of the solid-state image sensor 302 by receiving incident light (image light) from a subject. The solid-state image sensor 302 converts the amount of the incident light that forms an image on the image plane using the optical unit 301 into an electric signal in units of pixels and outputs the signal as a pixel signal. As the solid-state image sensor 302, a solid-state image sensor such as the CMOS image sensor 10 according to the embodiment described above, i.e., a solid-state image sensor that can realize expansion of a dynamic range can be used.

The display unit 305 includes, for example, a panel-type display device such as a liquid-crystal panel or an organic electro-luminescence (EL) panel, and displays dynamic images or still images captured using the solid-state image sensor 302. The recording unit 306 records dynamic images or still images captured using the solid-state image sensor 302 on a recording medium such as a video tape or a digital versatile disc (DVD).

The manipulation unit 307 issues manipulation commands with regard to various functions of the imaging apparatus 300 under control of a user. The power supply unit 308 appropriately supplies various types of power to be used as operation power of the DSP circuit 303, the frame memory 304, the display unit 305, the recording unit 306, and the manipulation unit 307 to the supply targets. The CPU 309 controls overall operations of the imaging apparatus 300.

Note that, in the imaging apparatus 300, the combining circuit 71 described in FIG. 4 may be included on the output side of the solid-state image sensor 302, and the DSP circuit 303 may be set to perform arithmetic operations for the combining circuit 71. In addition, regarding the solid-state image sensor 302 and the DSP circuit 303 as one solid-state image sensor, the DSP circuit 303 may be set to perform AD conversion of a low illuminance signal and a high illuminance signal and then perform arithmetic operations of a combined signal.

Figure 15:
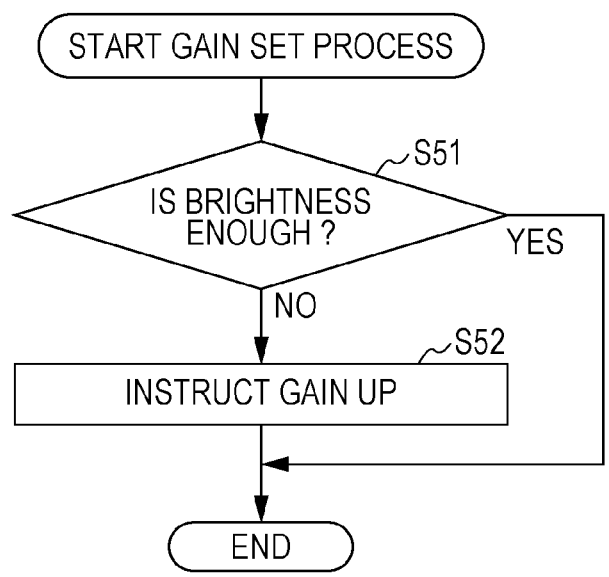
FIG. 15 is a flowchart for describing a gain setting process.

Herein, a gain setting process of the imaging apparatus 300 will be described with reference to the flowchart of FIG. 15. The gain setting process of FIG. 15 is executed when, for example, the photographing mode of the imaging apparatus 300 is set to an automatic photographing mode, or the like.

In Step S51, the DSP circuit 303 determines whether or not luminance of an image captured by the solid-state image sensor 302 is sufficient. To be specific, the DSP circuit 303 determines whether or not a luminance value of a pixel signal from the solid-state image sensor 302 is greater than a predetermined value.

In Step S51, when luminance is determined not to be sufficient, the DSP circuit 303 instructs the solid-state image sensor 302 to raise a gain in Step S52. To be specific, the DSP circuit 303 instructs a control circuit of the solid-state image sensor 302 (which corresponds to, for example, the control circuit 13 of the CMOS image sensor 10) to raise the setting of the analog gain. Accordingly, the solid-state image sensor 302 can output a digital signal (pixel signal) of which the gain has been raised.

On the other hand, when luminance is determined to be sufficient in Step S51, the process ends.

By executing the above process at a predetermined interval, it is possible to display or record an image that appears bright even in a dark place.

In addition, by using the CMOS image sensor 10 according to the above-described embodiment as the solid-state image sensor 302 as described above, the dynamic range can be expanded and a high S/N can be secured. Thus, captured images of high quality can be attained in the imaging apparatus 300 such as a video camera, a digital still camera, and further a camera module for mobile devices including mobile telephones.

In addition, in the embodiment described above, the example of the application to the CMOS image sensor in which unit pixels that sense signal electric charge as a physical amount according to an amount of visible light are arranged in a matrix shape has been described. The present technology is, however, not limited to the application to the CMOS image sensor, and can be applied to overall column-type solid-state image sensors in which column processing units are arranged for each pixel column of a pixel array unit.

In addition, the present technology is not limited to the application to a solid-state image sensor that senses distribution of amounts of incident light that is visible light and captures it as an image, but can be applied to overall solid-state image sensors which capture distribution of the incident amounts of infrared rays, x-rays, particles, or the like as an image, or solid-state image sensors in a broader sense including a fingerprint detection sensor that changes distribution of another physical amount such as pressure or an electrostatic capacity into an electric signal, performs time integration thereon, and then captures an image (a physical amount distribution sensing device).

Note that, in the present specification, the steps described in the flowcharts may of course be executed in a time series manner in the described orders, but are not necessarily so and may be executed in parallel or at necessary timings when called upon.

An embodiment of the present technology is not limited to the above-described embodiment, and can be variously modified within the scope not departing from the gist of the present technology.

What is claimed is:

1. A solid-state imaging device comprising:
    a pixel array section that includes pixels, which detect a physical quantity, arranged in two dimensions of a matrix;
    an Analog Digital (AD) conversion section that performs AD conversion for a plurality of channels of analog pixel signals which are read-out from the pixel array section to obtain digital output; and
    a control section that sets quantized units of the AD conversion section for the analog pixel signals according to a gain setting,
    wherein the control section determines a grayscale number of the digital output for at least one of the plurality of channels according to the gain setting.

2. The solid-state imaging device according to claim 1, wherein when raising the gain setting, the control section controls the quantized units to be small and the grayscale number of at least one of the plurality of channels to be large.

3. The solid-state imaging device according to claim 1, wherein the AD conversion section performs AD conversion for the analog pixel signals that have different sensitivities from each other, and when raising the gain setting, the control section controls the quantized units to be small and the grayscale number for at least one pixel signal having a high sensitivity of at least one of the plurality of channels to be large.

4. The solid-state imaging device according to claim 1, wherein when raising the gain setting, the control section controls the grayscale number of the digital output having a low sensitivity, of at least one channel not to change from the plurality of channels.

5. The solid-state imaging device according to claim 1, wherein before raising the gain setting, the control section controls the grayscale number of the digital output having a high sensitivity, of at least one channel from the plurality of channels to be smaller than the grayscale number of the digital output having a low sensitivity, of at least one channel from the plurality of channels.

6. The solid-state imaging device according to claim 1, wherein the AD conversion section performs AD conversion for the analog pixel signals that have different sensitivities from each other by setting a different detecting time for detecting the physical quantity by the pixels.

7. The solid-state imaging device according to claim 1, comprising a combining circuit that output a weighted average of a first signal and a second signal, wherein the first signal is a low illuminance signal and the second signal is a product of a high illuminance signal and a factor corresponding to a light amount ratio.

8. A method of driving a solid-state imaging device including a pixel array section including pixels, an Analog Digital (AD) conversion section, the method comprising:
    performing AD conversion for a plurality of channels of analog pixel signals which are read-out from the pixel array section to obtain digital output;
    setting quantized units of the AD conversion section for the analog pixel signals according to a gain setting of the analog pixel signals; and
    determining a grayscale number of the digital output of at least one of the plurality of channels according to the gain setting.

9. An electronic apparatus which is provided with a solid-state imaging device, wherein the solid-state imaging device comprises:
- a pixel array section including pixels, which detect a physical quantity, in two dimensions of a matrix;
- an Analog Digital (AD) conversion section for converting a plurality of channels of analog pixel signals which are read-out from the pixel array section to obtain digital output; and
- a control section for setting quantized units of the AD conversion section for the analog pixel signals according to a gain setting,
- wherein the control section determines grayscale numbers of the digital output for at least one of the plurality of channels according to the gain setting.

* * * * *